(12) United States Patent
Shen

(10) Patent No.: US 9,706,865 B2
(45) Date of Patent: Jul. 18, 2017

(54) CUP HOLDER WITH ADJUSTABLE DEPTH

(71) Applicant: Yanfeng Adient Seating Co. Ltd., Shanghai (CN)

(72) Inventor: Ruyi Shen, Shanghai (CN)

(73) Assignee: Yanfeng Adient Seating Co. Ltd., Shanghai (CN)

( * ) Notice: Subject to any disclaimer, the term of this patent is extended or adjusted under 35 U.S.C. 154(b) by 0 days.

(21) Appl. No.: 14/768,979

(22) PCT Filed: Jan. 29, 2014

(86) PCT No.: PCT/CN2014/071730
§ 371 (c)(1),
(2) Date: Aug. 19, 2015

(87) PCT Pub. No.: WO2014/127700
PCT Pub. Date: Aug. 28, 2014

(65) Prior Publication Data
US 2016/0000248 A1 Jan. 7, 2016

(30) Foreign Application Priority Data

Feb. 21, 2013 (CN) .......................... 2013 1 0055931

(51) Int. Cl.
*B65D 6/40* (2006.01)
*A47G 23/02* (2006.01)
*B60N 3/10* (2006.01)

(52) U.S. Cl.
CPC ......... *A47G 23/0216* (2013.01); *B60N 3/102* (2013.01); *B60N 3/105* (2013.01)

(58) Field of Classification Search
CPC .... A47G 23/0216; B60N 3/106; B60N 3/102; B60N 3/105; B60N 3/108
(Continued)

(56) References Cited

U.S. PATENT DOCUMENTS 6,834,838 B2 * 12/2004 Dennis ................... B60N 3/102
248/311.2
7,757,888 B2 * 7/2010 Ogura ................... B60N 3/102
220/345.1

(Continued)

*Primary Examiner* — Shawn M Braden
(74) *Attorney, Agent, or Firm* — John P. White; Cooper & Dunham LLP

(57) ABSTRACT

A cup holder with an adjustable depth includes: a cup-holder base, having at least one accommodation hole; a fixed cup holder, fixed in the accommodation hole of the cup-holder base; and a moveable cup holder, moveably sleeved over the fixed cup holder and capable of rotating around the fixed cup holder to ascend and descend, where during ascending and descending of the moveable cup holder, an inner cavity of the moveable cup holder and an inner cavity of the fixed cup holder jointly define a container placement hole for placement of containers of different heights. The present invention solves the problem that containers of different heights placed in the cup holder easily fall out when the automobile is accelerating, hard braking or travelling over uneven road surfaces. In addition, after the moveable cup holder descends to the lowest position, the moveable cup holder can completely overlap the fixed cup holder, so that the entire cup holder has a small height and is therefore suitable for installation in a thin interior trim part of the automobile, for example, in the armrest at the rear seat, thereby saving interior trim space in the automobile.

13 Claims, 13 Drawing Sheets

(58) Field of Classification Search
USPC .................................................. 220/8, 737
See application file for complete search history.

(56) References Cited

U.S. PATENT DOCUMENTS

| | | | | |
|---|---|---|---|---|
| 8,205,767 B2* | 6/2012 | Lawlor | ................. | B60N 3/106 |
| | | | | 220/737 |
| 8,579,149 B2* | 11/2013 | Henke | ..................... | B60N 3/10 |
| | | | | 220/634 |
| 2003/0197104 A1* | 10/2003 | Heybl | ................ | A47G 23/0225 |
| | | | | 248/311.2 |
| 2004/0069792 A1* | 4/2004 | Schaal | .................. | B60N 3/102 |
| | | | | 220/737 |
| 2012/0248106 A1* | 10/2012 | Marta | ................. | B65D 21/086 |
| | | | | 220/8 |

* cited by examiner

CUP HOLDER WITH ADJUSTABLE DEPTH

CROSS-REFERENCE TO RELATED APPLICATIONS

This application is a §371 national stage of PCT International Application No. PCT/CN2014/071730, filed Jan. 29, 2012, claiming priority of Chinese Patent Application No. 201310055931.7, filed Feb. 21, 2013, the contents of each of which are hereby incorporated by reference in their entirety.

BACKGROUND

Technical Field

The present invention relates to a cup holder for automobiles, and more particularly to a cup holder with an adjustable depth.

Related Art

Nowadays, cup holder devices have become an indispensable component of automobiles. There is currently a diversity of cup holders for automobiles, and various different cup holders may be designed to meet different requirements. However, because the interior trim space of an automobile is limited, placement of cups or bottles of various heights often can not be satisfied. Assuming that a cup holder has a depth designed for the placement of beverage cans or cups of similar height, if a mineral water bottle or a container of similar height is placed in the cup holder, the mineral water bottle having a high center of gravity can not be stably held. When the automobile is accelerating, hard braking or travelling over uneven road surfaces, the mineral water bottle easily falls out of the cup holder. If a cup holder is designed according to the height of a mineral water bottle, it is difficult to put in or take out a short container, and there may not be enough interior trim (interior decoration) space for designing a cup holder of such a height.

Chinese Patent Publication No. CN202557374 provides an adjustable cup holder device for automobiles, which includes a cup holder housing, a placement hole provided on the cup holder housing, and a cup holder disposed inside the placement hole. The cup holder is a moveable structure, a placement-hole-depth adjustment mechanism is provided below the cup holder, and the cup holder housing is provided with a position locking mechanism. The positional height of the cup holder can be adjusted by means of the placement-hole-depth adjustment mechanism, and after adjustment, the position of the cup holder can be locked by means of the position locking mechanism; in this way, different depths of the placement hole can be obtained. Although this patent solves the problem of placement of containers of different heights, adequate interior trim space is required during installation because the cup holder housing is designed according to the height of a high container. For example, the adjustable cup holder device provided by the above-mentioned patent cannot be installed in the armrest at the rear seat.

SUMMARY

The technical problem to be solved by the present invention is to solve the above-mentioned problems of the existing cup holders for automobiles and provide a cup holder with an adjustable depth, which occupies small interior trim space after being folded, and can be installed in a thin interior trim part, for example, in the armrest at the rear seat.

The technical problem to be solved by the present invention can be achieved by means of the following technical solution:

A cup holder with an adjustable depth, including:

a cup-holder base, having at least one accommodation hole;

a fixed cup holder, fixed in the accommodation hole of the cup-holder base; and a moveable cup holder, moveably sleeved over the fixed cup holder and capable of rotating around the fixed cup holder to ascend and descend, where during ascending and descending of the moveable cup holder, an inner cavity of the moveable cup holder and an inner cavity of the fixed cup holder jointly define a container placement hole for placement of containers of different heights.

In a preferred embodiment of the present invention, the fixed cup holder and the moveable cup holder both have a cup wall, and the cup wall of the moveable cup holder is inserted between a hole wall of the accommodation hole and the cup wall of the fixed cup holder; at least one ascending/descending spiral raised strip is provided on an outer surface of the cup wall of the fixed cup holder; at least one pair of guide blocks that clamps the ascending/descending spiral raised strip vertically and cooperates with the ascending/descending spiral raised strip to drive the moveable cup holder to ascend and descend is provided on an inner surface of the cup wall of the moveable cup holder; and when the moveable cup holder rotates around the fixed cup holder, one pair of guide blocks slides along a trajectory defined by the ascending/descending spiral raised strip and drives the moveable cup holder to ascend and descend, wherein one pair of guide blocks includes an upper guide block and a lower guide block.

In a preferred embodiment of the present invention, the upper and lower guide blocks are staggered from each other in both a horizontal plane of projection and a vertical plane of projection, and the ascending/descending spiral raised strip passes between the upper and lower guide blocks.

In a preferred embodiment of the present invention, an upper end portion of the ascending/descending spiral raised strip terminates at an opening of the fixed cup holder, and a lower end portion of the ascending/descending spiral raised strip terminates at a cup bottom of the fixed cup holder.

In a preferred embodiment of the present invention, a first cup rim having a diameter greater than an outer diameter of the fixed cup holder is provided at a periphery of the opening of the fixed cup holder; the upper end portion of the ascending/descending spiral raised strip is a first straight raised strip segment parallel to the first cup rim, there is a smooth transition joint between the first straight raised strip segment and a spiral segment of the ascending/descending spiral raised strip, and a width dimension of the first straight raised strip segment is smaller than a width dimension of the spiral segment of the ascending/descending spiral raised strip and a vertical spacing between the upper and lower guide blocks in the vertical plane of projection; an upper stop block is provided between the first straight raised strip segment and the first cup rim, and a self-locking groove for insertion of the upper guide block is defined between the first cup rim and a segment of the first straight raised strip segment that is from the upper stop block to the transition joint between the first straight raised strip segment and the spiral segment of the ascending/descending spiral raised strip; and when the moveable cup holder ascends to the highest position, the upper guide block enters the self-locking groove so that the moveable cup holder is self-locked.

In a preferred embodiment of the present invention, a raised point is provided on the cup wall of the fixed cup holder at the transition joint between the first straight raised strip segment and the spiral segment of the ascending/descending spiral raised strip, so that when the moveable cup holder ascends to the highest position, the upper guide block moves over the raised point and enters the self-locking groove so that the moveable cup holder is self-locked.

In a preferred embodiment of the present invention, the lower end portion of the ascending/descending spiral raised strip is a second straight raised strip segment perpendicular to the cup bottom of the fixed cup holder, and a height dimension of the second straight raised strip segment is slightly greater than a width dimension of the lower guide block.

In a preferred embodiment of the present invention, a second cup rim is provided at an opening of the moveable cup holder, and friction strips are provided on an outer surface of the second cup rim.

In a preferred embodiment of the present invention, a second cup rim is provided at an opening of the moveable cup holder, and indentations for placement of fingers are provided on an outer surface of the second cup rim.

In a preferred embodiment of the present invention, at least one hook is provided at a cup bottom of the fixed cup holder, a notch at a position corresponding to each hook is provided at the bottom of the accommodation hole on the cup-holder base, and the hook is engaged in the notch so that the fixed cup holder is fixed in the accommodation hole on the cup-holder base.

In a preferred embodiment of the present invention, an upward projecting protective flange is provided at a circumference of a top surface of the cup-holder base, and after the moveable cup holder descends to the lowest position, a top surface of the moveable cup holder is flush with or lower than a topmost surface of the protective flange.

The present invention may alternatively adopt the following two technical solutions:

In a first technical solution, the fixed cup holder and the moveable cup holder both have a cup wall; at least one ascending/descending spiral raised strip is provided on an inner surface of the cup wall of the moveable cup holder; at least one pair of guide blocks that clamps the ascending/descending spiral raised strip vertically and cooperates with the ascending/descending spiral raised strip to drive the moveable cup holder to ascend and descend is provided on an outer surface of the cup wall of the fixed cup holder; and when the moveable cup holder rotates around the fixed cup holder, one pair of guide blocks slides along a trajectory defined by the ascending/descending spiral raised strip and drives the moveable cup holder to ascend and descend, where one pair of guide blocks includes an upper guide block and a lower guide block.

In a second technical solution, the accommodation hole on the cup-holder base and the fixed cup holder are integrated to form a unity, a hole wall of the accommodation hole directly serves as an inner surface of the cup wall of the fixed cup holder, the moveable cup holder is directly inserted into the accommodation hole, the moveable cup holder can rotate around the center of the accommodation hole and ascend and descend while rotating, and the inner cavity of the moveable cup holder and an inner cavity of the accommodation hole jointly define a container placement hole for placement of containers of different heights.

At least one ascending/descending spiral raised strip is provided on an inner surface of the hole wall of the accommodation hole; at least one pair of guide blocks that clamps the ascending/descending spiral raised strip vertically and cooperates with the ascending/descending spiral raised strip to drive the moveable cup holder to ascend and descend is provided on an inner surface of the cup wall of the moveable cup holder; and when the moveable cup holder rotates around the center of the accommodation hole, one pair of guide blocks slides along a trajectory defined by the ascending/descending spiral raised strip and drives the moveable cup holder to ascend and descend, where one pair of guide blocks includes an upper guide block and a lower guide block.

By means of the above-mentioned technical solutions, on one hand, the moveable cup holder of the present invention rotates around the fixed cup holder; on the other hand, the moveable cup holder ascends and descends by means of the ascending/descending spiral raised strips on the fixed cup holder, to adjust the depth of the container placement that is jointly defined by the inner cavity of the moveable cup holder and the inner cavity of the fixed cup holder, thereby solving the problem that containers of different heights placed in the cup holder easily fall out when the automobile is accelerating, hard braking or travelling over uneven road surfaces. In addition, after the moveable cup holder descends to the lowest position, the moveable cup holder can completely overlap the fixed cup holder, so that the entire cup holder has a small height and is therefore suitable for installation in a thin interior trim part of the automobile, for example, in the armrest at the rear seat, thereby saving interior trim space in the automobile.

DETAILED DESCRIPTION

Figure 1:
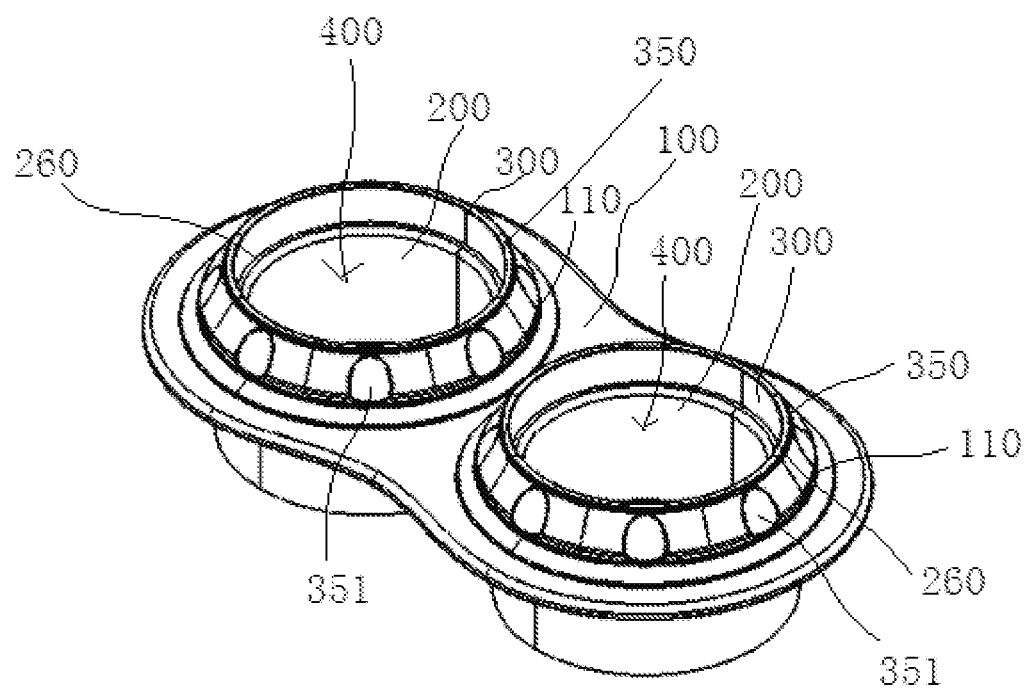
FIG. 1 is a schematic view illustrating the state of a cup holder with an adjustable depth according to an embodiment of the present invention before the moveable cup holder ascends.

The present invention is described in further detail with reference to the accompanying drawings and specific embodiments.

Referring to FIG. 1 to FIG. 16, a specific cup holder with an adjustable depth according to the present invention is provided. The cup holder with an adjustable depth includes a cup-holder base 100, where two accommodation holes 110 are symmetrically provided on the cup-holder base 100; definitely, there may alternatively be only one accommodation hole 110.

One fixed cup holder 200 and one moveable cup holder 300 are placed in each accommodation hole 110. The fixed cup holder 200 is fixed in the accommodation hole 110 of the cup-holder base 100, and the moveable cup holder 300 is sleeved over the fixed cup holder 200 and capable of rotating around the fixed cup holder 200 to ascend and descend. During ascending and descending of the moveable cup holder 300, an inner cavity 310 of the moveable cup holder 300 and an inner cavity 210 of the fixed cup holder 200 jointly define a container placement hole 400 for placement of containers of different heights.

Figure 2:
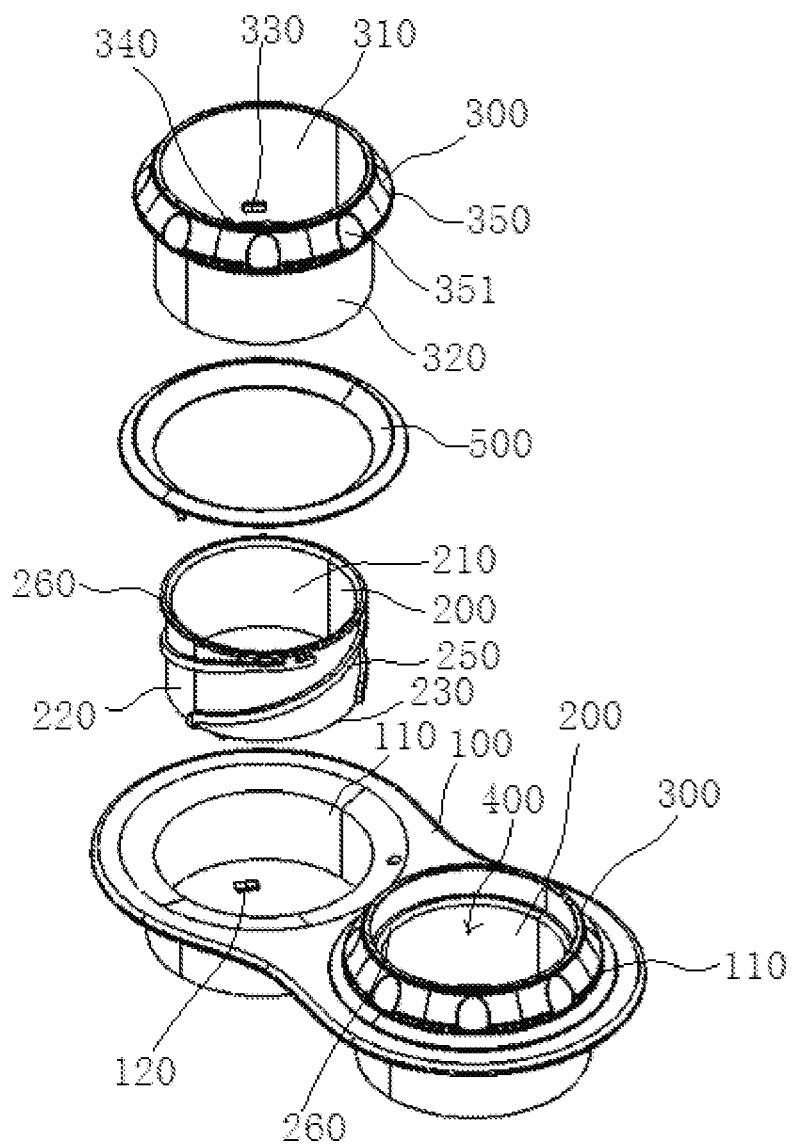
FIG. 2 is a schematic exploded view of some parts of the cup holder with an adjustable depth shown in FIG. 1.
Figure 3:
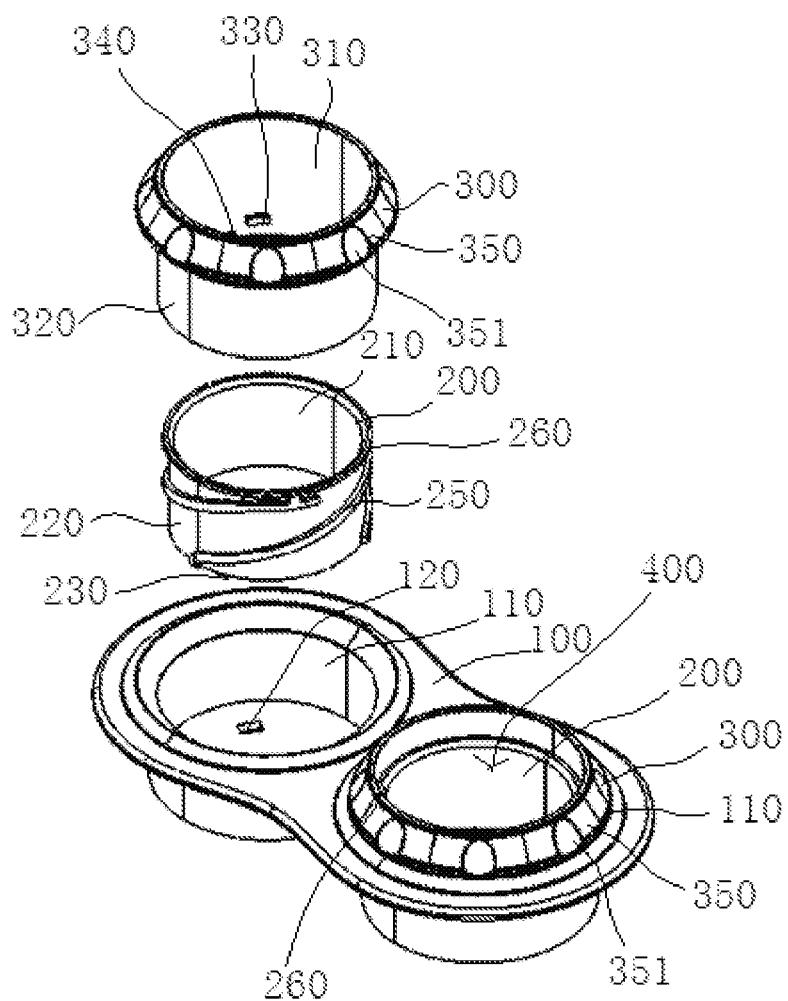
FIG. 3 is a schematic exploded view of some parts of the cup holder with an adjustable depth shown in FIG. 1 after the chromium-plated decorative ring is removed.
Figure 4:
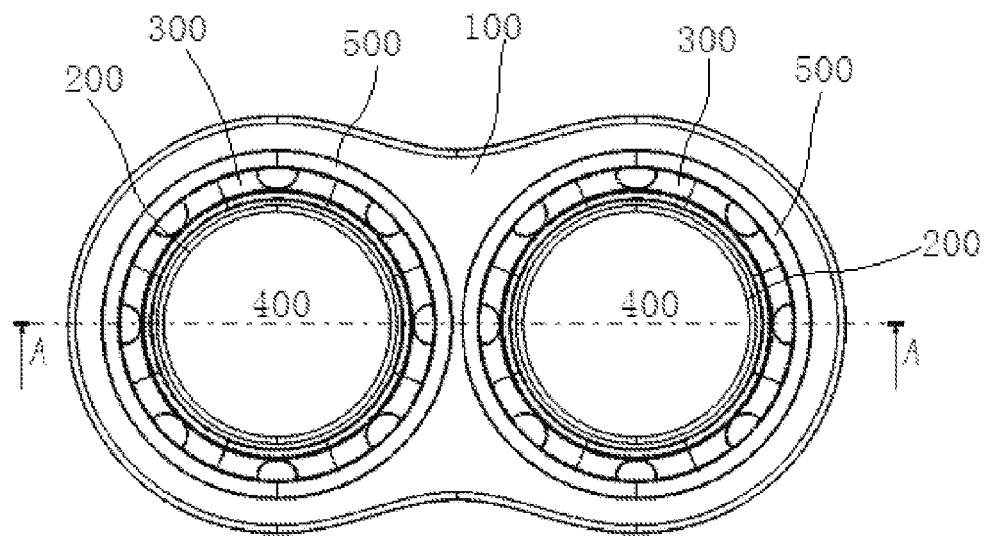
FIG. 4 is a top view of the cup holder with an adjustable depth shown in FIG. 1.
Figure 5:
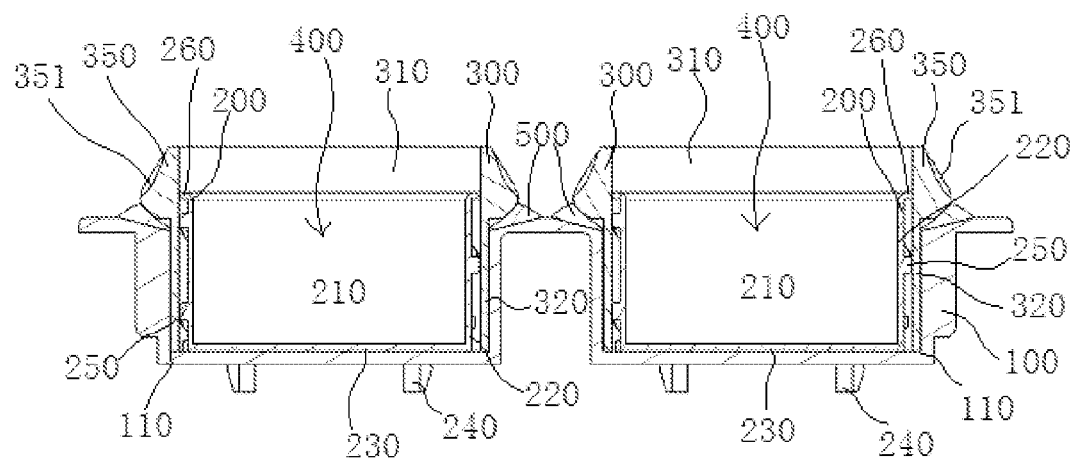
FIG. 5 is an A-A sectional view of FIG. 4.
Figure 6:
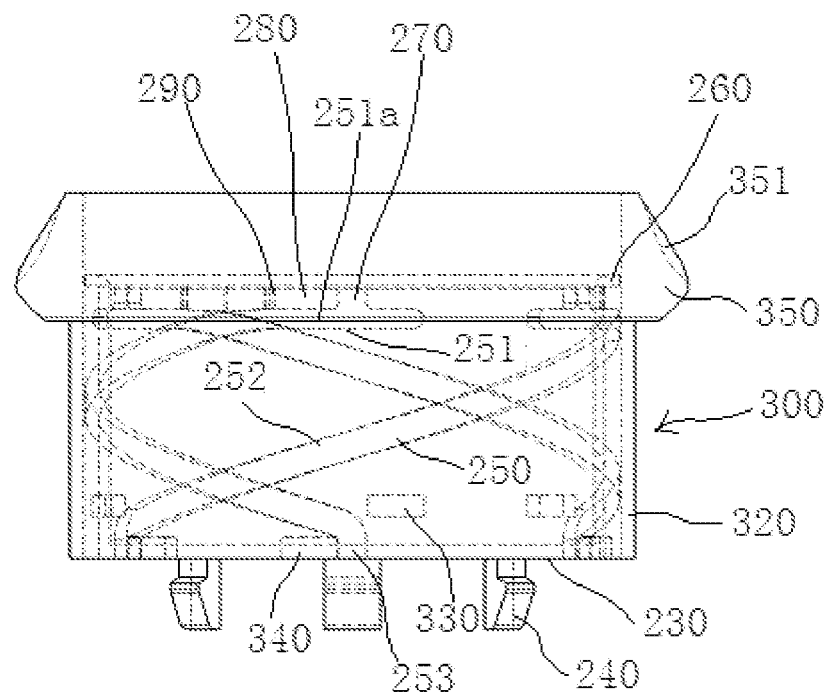
FIG. 6 is a perspective assembled view of the cup holder with an adjustable depth shown in FIG. 1 before the moveable cup holder ascends.
Figure 7:
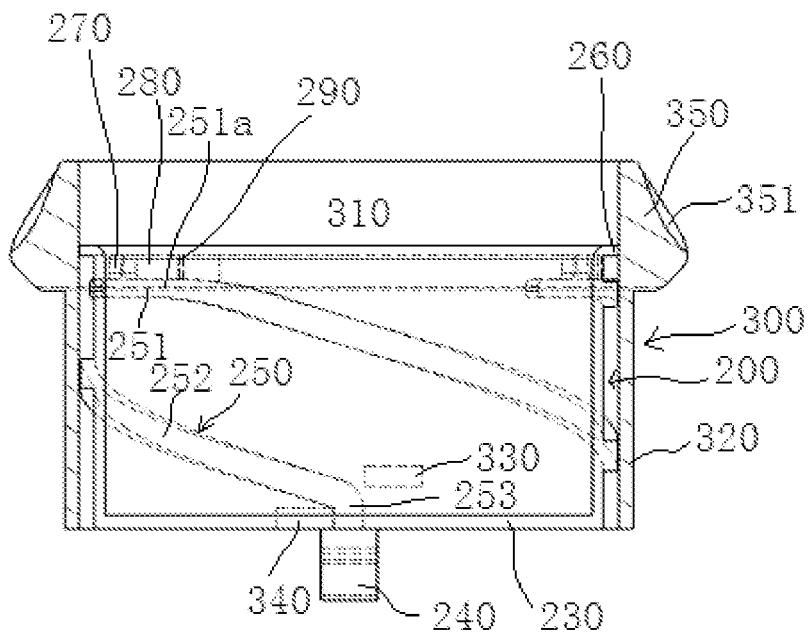
FIG. 7 is a partially assembled sectional view of the cup holder with an adjustable depth shown in FIG. 1 before the moveable cup holder ascends.

To provide a decorative effect, a chromium-plated decorative ring 500 may be disposed at an opening of the fixed cup holder 200 as shown in FIG. 2, or no chromium-plated decorative ring needs to be provided at the opening of the fixed cup holder 200 as shown in FIG. 3.

Still referring to FIG. 1 to FIG. 16, the fixed cup holder 200 has a cylindrical cup wall 220 and a cup bottom 230, and the moveable cup holder 300 has only a cylindrical cup wall 320.

For the ease of fixing the fixed cup holder 200 into the accommodation hole 110 of the cup-holder base 100, three hooks 240 are evenly arranged on a bottom surface of the cup bottom 230 of the fixed cup holder 200; definitely, there may alternatively be one hook or two hooks only, or more than three hooks. A notch 120 corresponding to each hook 240 is provided at the bottom of the accommodation hole 110 on the cup-holder base 100, and the three hooks 240 correspond to three notches 120. After the moveable cup holder 300 is sleeved over the fixed cup holder 200 and then installed into the accommodation hole 110, the three hooks 230 pass through the corresponding notches 120 and then hook a bottom surface of the cup-holder base 100, so that the fixed cup holder 200 is fixed in the accommodation hole 110. Definitely, the fixed cup holder 200 may also be fixed in any other manner well known to those skilled in the art.

After the fixed cup holder 200 is fixed, the cup wall of the moveable cup holder 300 is inserted between a hole wall of the accommodation hole 110 and the cup wall 220 of the fixed cup holder 200. To enable the moveable cup holder 300 to ascend and descend while rotating around the fixed cup holder 200, in a specific implementation, three ascending/descending spiral raised strips 250 are evenly arranged on an outer surface of the cup wall 220 of the fixed cup holder 200; definitely, there may alternatively be one ascending/descending spiral raised strip 250 or two ascending/descending spiral raised strips 250 only, or more than three ascending/descending spiral raised strips 250 as required. In addition, corresponding to each ascending/descending spiral raised strip 250, one pair of upper and lower guide blocks 330 and 340 that clamps the ascending/descending spiral raised strip 250 vertically and cooperates with the ascending/descending spiral raised strip 250 to drive the moveable cup holder 300 to ascend and descend is provided on an inner surface of the cup wall 320 of the moveable cup holder 300. Because three ascending/descending spiral raised strips 250 are evenly arranged on the outer surface of the cup wall 220 of the fixed cup holder 200 in this specific implementation, three pairs of upper and lower guide blocks 330 and 340 are evenly arranged on the inner surface of the cup wall 320 of the moveable cup holder 300.

The upper and lower guide blocks 330 and 340 in each pair are staggered from each other in both a horizontal plane of projection and a vertical plane of projection, and the corresponding ascending/descending spiral raised strip 250 passes between the upper and lower guide blocks 330 and 340. When the moveable cup holder 300 rotates around the fixed cup holder 200, one pair of upper and lower guide blocks 330 and 340 slides along a trajectory defined by the ascending/descending spiral raised strip 250 and drives the moveable cup holder 300 to ascend and descend.

To limit the angle of rotation of the moveable cup holder 300 and two extreme positions of ascending and descending, an upper end portion of each ascending/descending spiral raised strip 250 terminates at the opening of the fixed cup holder 200, and a lower end portion of each ascending/descending spiral raised strip 250 terminates at the cup bottom of the fixed cup holder 200.

Figure 8:
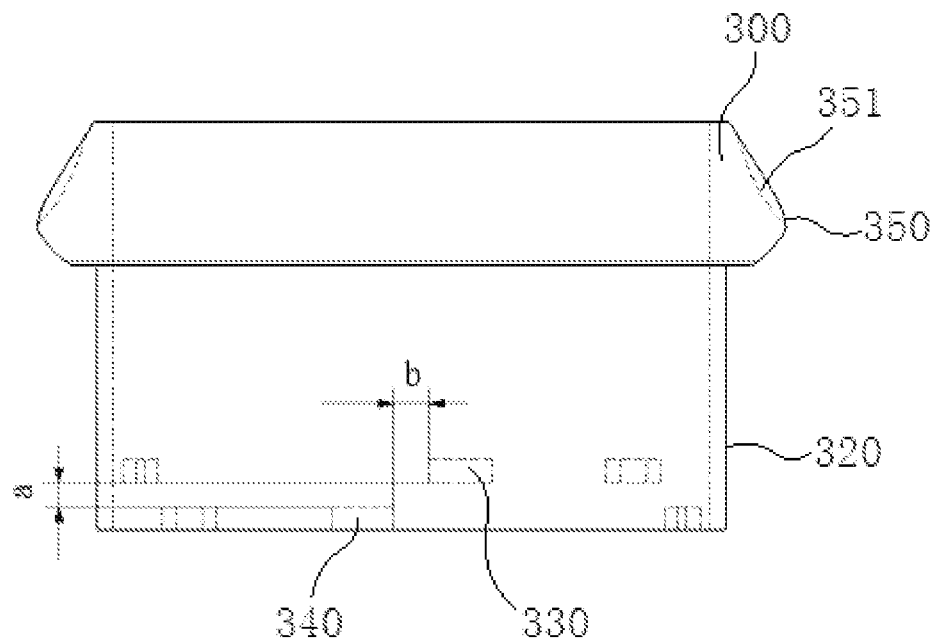
FIG. 8 is a schematic structural diagram of the moveable cup holder in the cup holder with an adjustable depth shown in FIG. 1.
Figure 9:
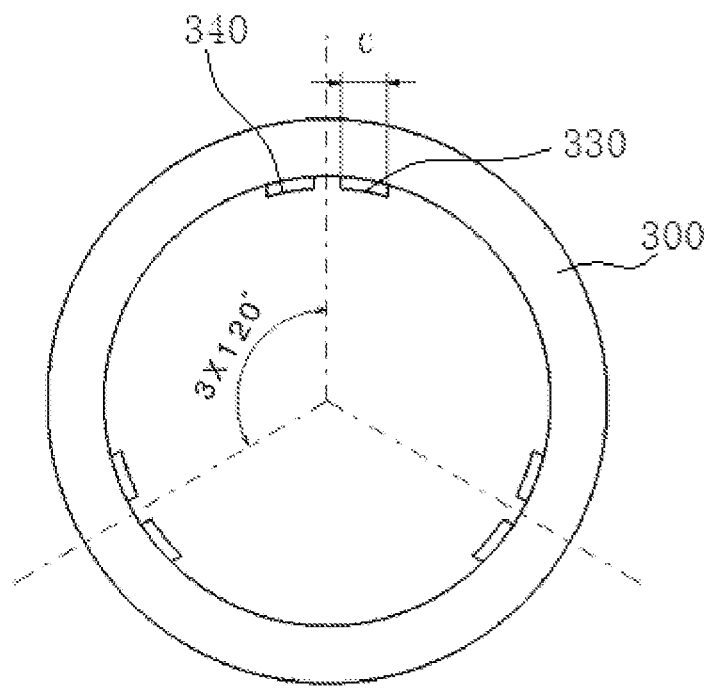
FIG. 9 is a top view of FIG. 8.
Figure 10:
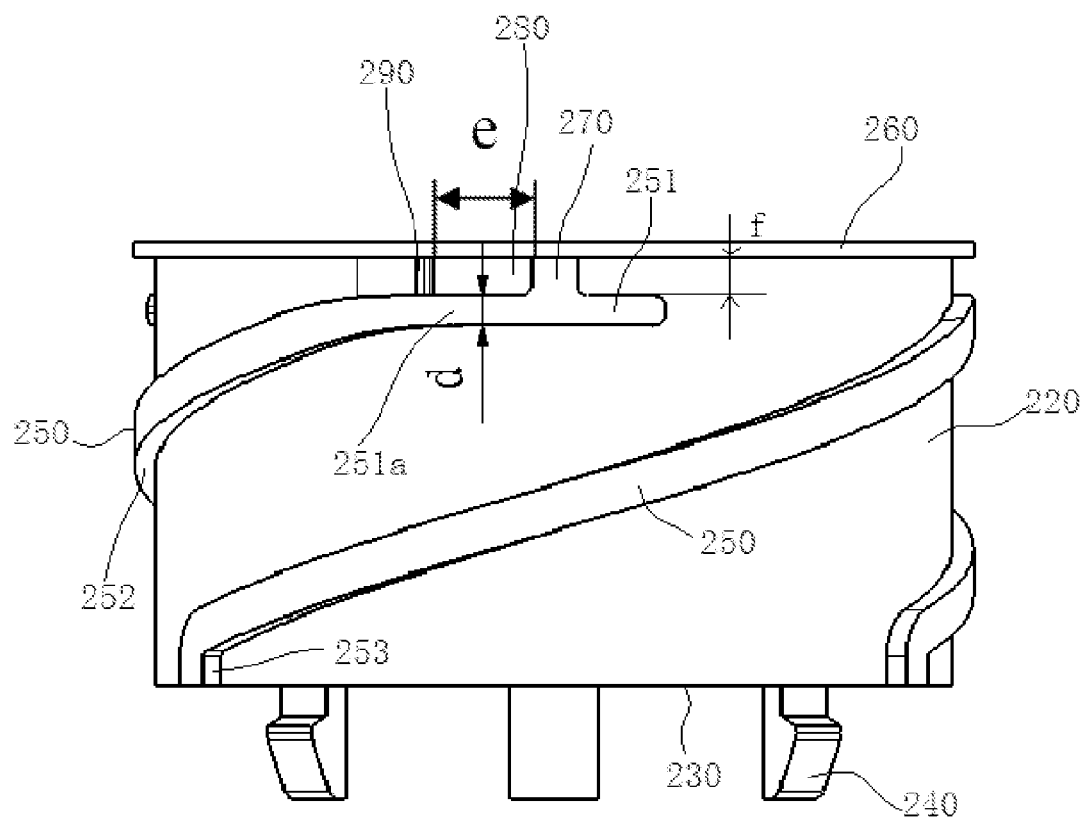
FIG. 10 is a schematic structural diagram of the fixed cup holder in the cup holder with an adjustable depth shown in FIG. 1.
Figure 11:
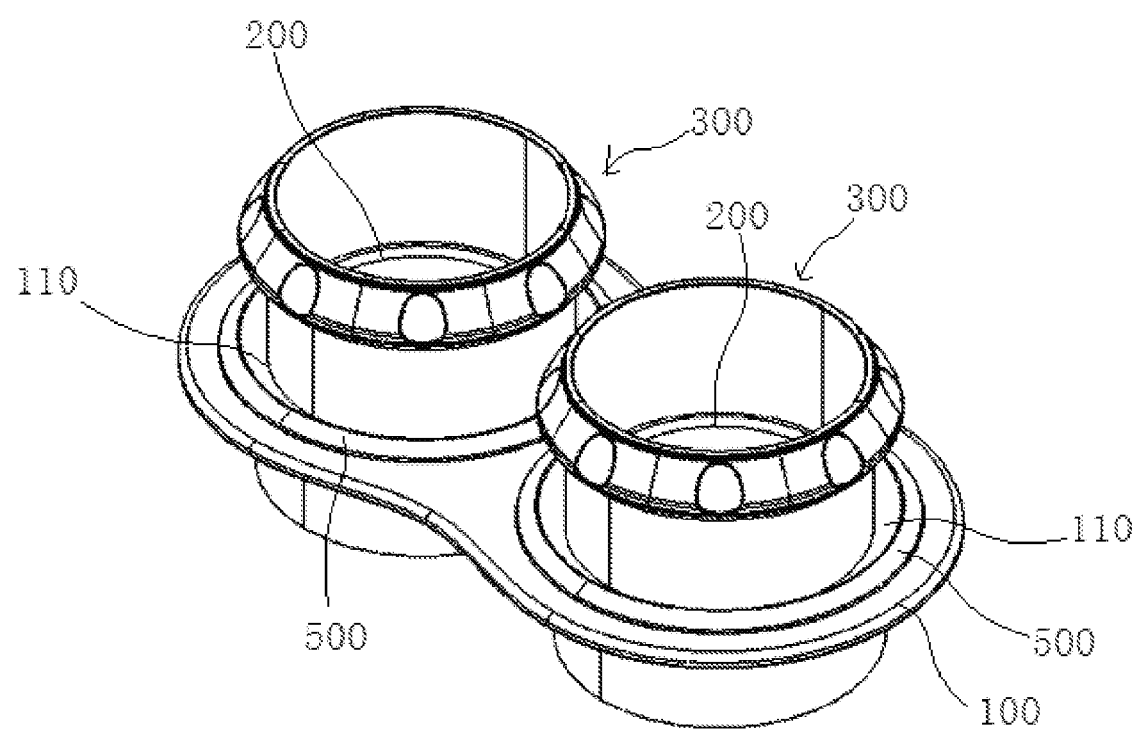
FIG. 11 is a three-dimensional schematic view of the cup holder with an adjustable depth shown in FIG. 1 after two moveable cup holders ascend to the highest position.
Figure 12:
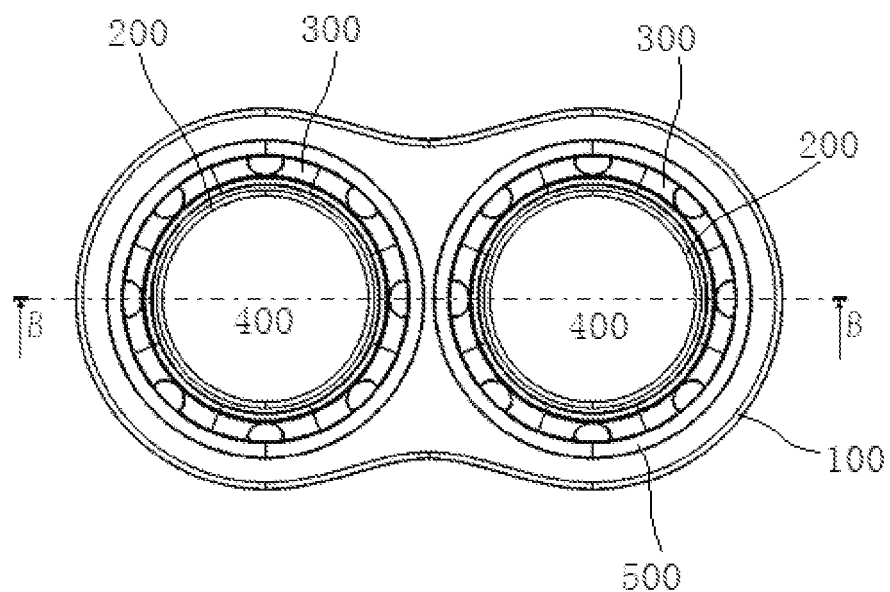
FIG. 12 is a top view of FIG. 11.
Figure 13:
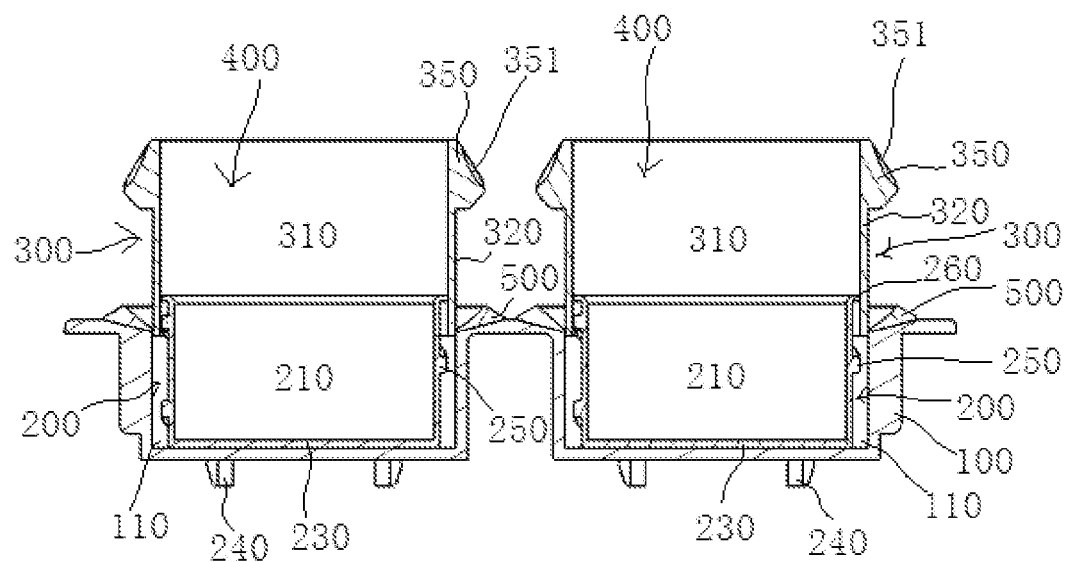
FIG. 13 is a B-B sectional view of FIG. 12.
Figure 14:
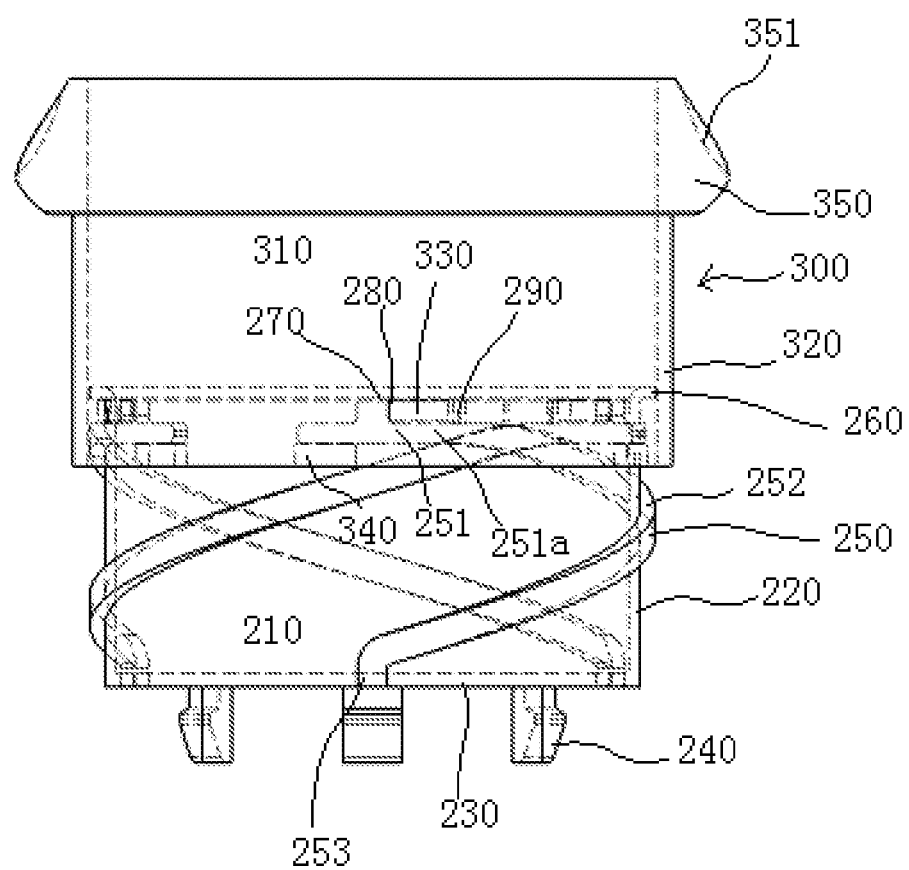
FIG. 14 is a schematic view of the cup holder with an adjustable depth shown in FIG. 1, illustrating the relationship between positions of one moveable cup holder that ascends to the highest position and the fixed cup holder.
Figure 15:
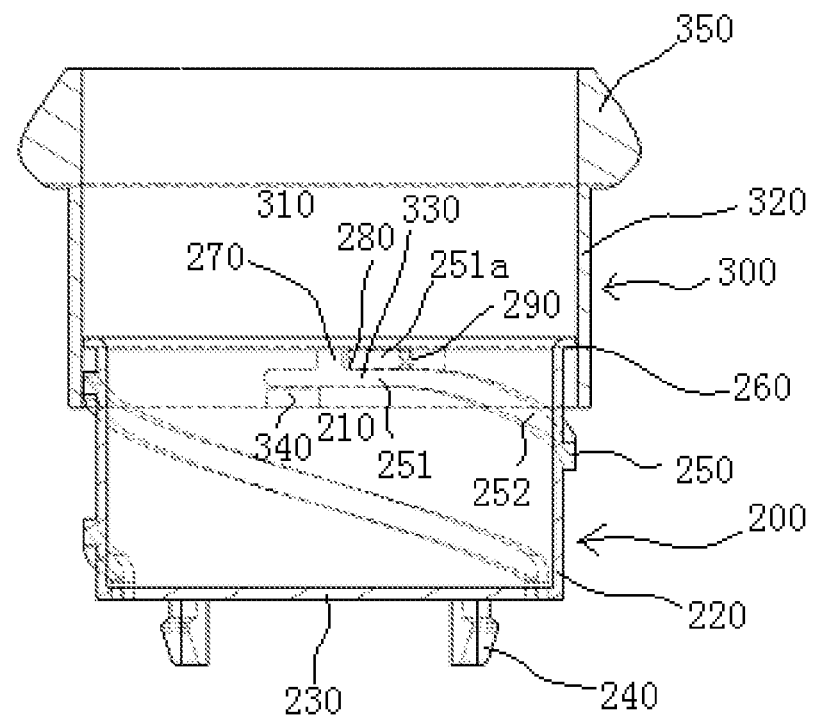
FIG. 15 is a sectional view of the cup holder with an adjustable depth shown in FIG. 1, illustrating the relationship between positions of one moveable cup holder that ascends to the highest position and the fixed cup holder.
Figure 16:
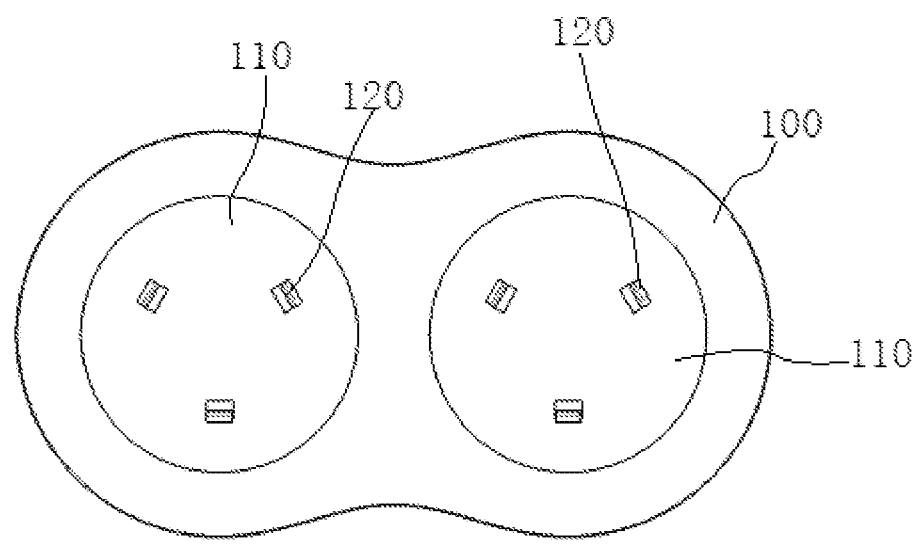
FIG. 16 is a top view of the cup-holder base in the cup holder with an adjustable depth shown in FIG. 1.

A preferred implementation for limiting the angle of rotation of the moveable cup holder 300 and two extreme positions of ascending and descending is as follows: a cup rim 260 having a diameter greater than an outer diameter of the fixed cup holder 200 is provided at a periphery of the opening of the fixed cup holder 200; the upper end portion of the ascending/descending spiral raised strip 250 is a straight raised strip segment 251 parallel to the cup rim 260; there is a smooth transition joint between the straight raised strip segment 251 and a spiral segment 252 of the ascending/descending spiral raised strip 250, and a width dimension of the straight raised strip segment 251 is smaller than a width dimension of the spiral segment 252 of the ascending/descending spiral raised strip 250 and a vertical spacing a between the upper and lower guide blocks 330 and 340 in the vertical plane of projection (referring to FIG. 8 and FIG. 10).

An upper stop block 270 is provided between the straight raised strip segment 251 and the cup rim 260, and a self-locking groove 280 for insertion of the upper guide block 330 is defined between the cup rim 260 and a straight raised strip segment 251a that is from the upper stop block 270 to the transition joint between the straight raised strip segment 251 and the spiral segment 252 of the ascending/descending spiral raised strip 250. The length of the straight raised strip segment 251 should be greater than a length dimension e of the self-locking groove 280 (referring to FIG. 10), the length dimension e of the self-locking groove 280 should be greater than a length dimension of the upper guide block 330, and a width dimension f of the self-locking groove 280 should not be smaller than a width dimension c of the upper guide block 330. In addition, a raised point 290 is provided on the cup wall 220 at the transition joint between the straight raised strip segment 251 and the spiral segment 252 of the ascending/descending spiral raised strip 250, so that when the moveable cup holder 300 ascends to the highest position, the upper guide block 330 moves over the raised point 290 and enters the self-locking groove 280 so that the moveable cup holder 300 is self-locked. If the moveable cup holder 300 needs to be lowered, the moveable cup holder 300 can be rotated in a reverse direction, so that the upper guide block 330 moves over the raised point 290 to achieve unlocking In addition, the lower end portion of the ascending/descending spiral raised strip 250 is a straight raised strip segment 253 perpendicular to the cup bottom 230 of the fixed cup holder 200, a height dimension of the straight raised strip segment 253 is slightly greater than a width dimension of the lower guide block 340, and a width dimension of the straight raised strip segment 253 should be smaller than a horizontal spacing b between the upper and lower guide blocks 330 and 340 in the vertical plane of projection (referring to FIG. 8). In this way, when the moveable cup holder 300 rotates to the lowest position, the lower guide block 340 is stopped by the straight raised strip segment 253 so that the moveable cup holder 300 cannot continue rotating or descending.

For the ease of rotating the moveable cup holder 300 with fingers, a cup rim 350 is provided at an opening of the moveable cup holder 300, and several indentations 351 for placement of fingers are evenly provided on an outer surface of the cup rim 350 or friction strips are provided on the outer surface of the cup rim 350.

Figure 17:
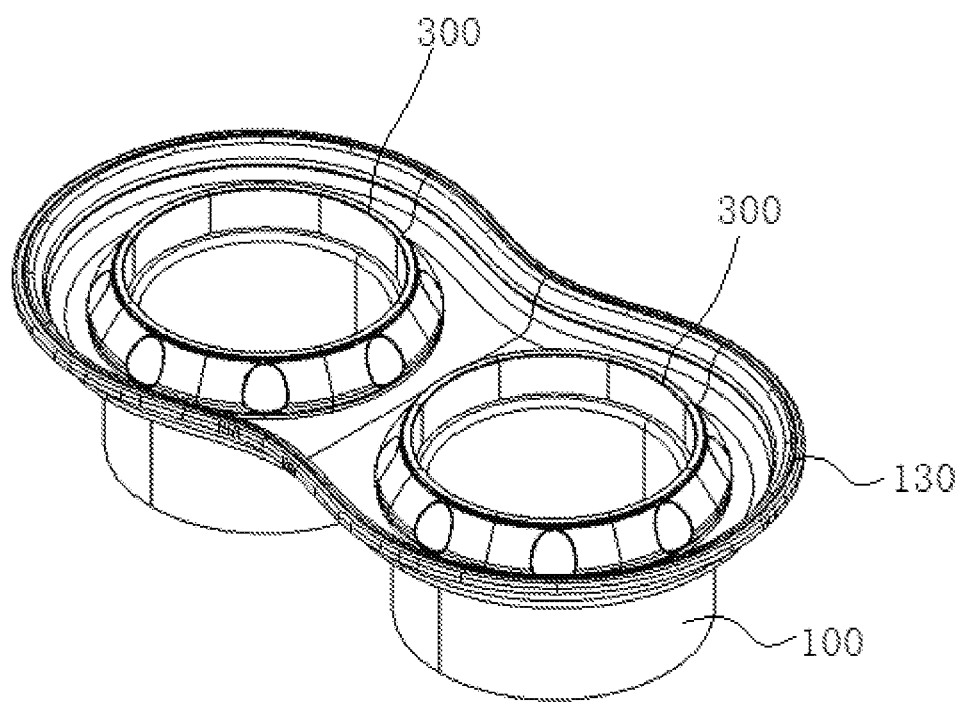
FIG. 17 is a schematic view illustrating the state of a cup holder with an adjustable depth according to an embodiment of the present invention before the moveable cup holder ascends.
Figure 18:
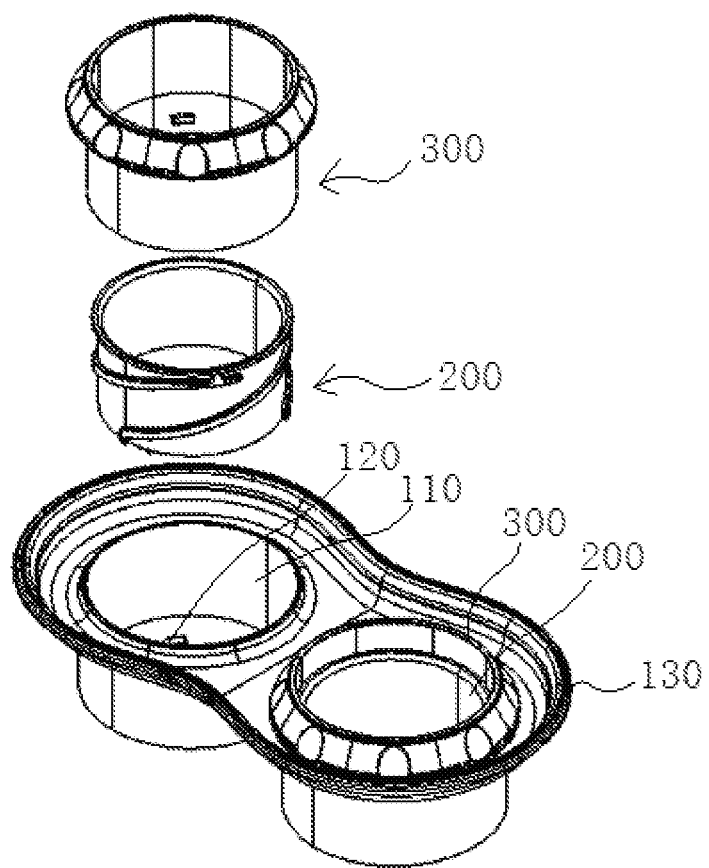
FIG. 18 is a schematic exploded view of some parts of the cup holder with an adjustable depth shown in FIG. 17.

The following improvement may further be made to the cup holder with an adjustable depth that is provided in the foregoing specific implementation: referring to FIG. 17 and FIG. 18, that is, an upward projecting protective flange 130 is provided at a circumference of a top surface of the cup-holder base 100, and after the moveable cup holder 300 descends to the lowest position, a top surface of the moveable cup holder 300 is flush with or lower than a topmost surface of the protective flange 130.

The mode of operation of the cup holder with an adjustable depth according to the foregoing specific implementation is as follows: When the moveable cup holder 300 is rotated, the upper and lower guide blocks 330 and 340 in the moveable cup holder 300 move along the trajectory of the ascending/descending spiral raised strip 250 on the fixed cup holder 200, so that the moveable cup holder 300 ascends while rotating. After the moveable cup holder 300 reaches the highest position, the upper guide block 330 moves over the raised point 290 and enters the self-locking groove 280, thereby achieving locking; at this time, the cup holder is at its highest position, that is, the container accommodation hole 400 reaches its largest depth. When the moveable cup holder 300 ascends, the trajectory of the ascending/descending spiral raised strip 250 on the fixed cup holder 200 is always between the upper and lower guide blocks 330 and 340 of the moveable cup holder 300, which provides a position limiting effect.

Based on the above, the present invention provides a cup holder with an adjustable depth for automobiles, which is suitable for placement of containers of different heights and can held the containers more stably when the automobile is travelling. Even if the space is not deep enough, for example, the armrest at the rear seat has a thin foamed layer, the cup holder can be deployed, and a required clamping depth can be satisfied by adjusting the height of the cup holder, which ensures stability of the container in the cup holder, and can effectively solve the problems that containers of different heights placed in the cup holder easily fall out when the automobile is accelerating, hard braking or travelling over uneven road surfaces.

The cup holder with an adjustable depth according to the present invention may also adopt the following two technical solutions:

1. The ascending/descending spiral raised strips 250 are provided on the inner surface of the cup wall 320 of the moveable cup holder 300, the upper and lower guide blocks 330 and 340 are provided on the outer surface of the cup wall 220 of the fixed cup holder 200, and the positional height needs to be adjusted. When the moveable cup holder 300 rotates around the fixed cup holder 200, one pair of upper and lower guide blocks 330 and 340 slides along a trajectory defined by the ascending/descending spiral raised strip 250 and drives the moveable cup holder 300 to ascend and descend.

2. The accommodation hole 110 of the cup-holder base 100 and the fixed cup holder 200 are integrated to form a unity, that is, the fixed cup holder 200 is omitted, the hole wall of the accommodation hole 110 serves as the inner surface of the cup wall 220 of the fixed cup holder 200, the moveable cup holder 300 is directly inserted into the accommodation hole 110, the ascending/descending spiral raised strips 250 are provided on an inner surface of the accommodation hole 110 of the cup-holder base, and the upper and lower guide blocks 330 and 340 are provided on an outer surface of the cup wall 320 of the moveable cup holder 300. When the moveable cup holder 300 rotates around the accommodation hole of the cup-holder base, one pair of upper and lower guide blocks 330 and 340 slides along a trajectory defined by the ascending/descending spiral raised strip 250 and drives the moveable cup holder 300 to ascend and descend. In this way, the inner cavity 310 of the moveable cup holder 300 and an inner cavity of the accommodation hole 110 jointly define a container placement hole 400 for placement of containers of different heights.

What is claimed is:

1. A cup holder with an adjustable depth, comprising:
a cup-holder base, having at least one accommodation hole;
a fixed cup holder, fixed in the accommodation hole of the cup-holder base; and
a moveable cup holder, moveably sleeved over the fixed cup holder and capable of rotating around the fixed cup holder to ascend and descend, wherein during ascending and descending of the moveable cup holder, an inner cavity of the moveable cup holder and an inner cavity of the fixed cup holder jointly define a container placement hole for placement of containers of different heights,
wherein the fixed cup holder and the moveable cup holder both have a cup wall, and the cup wall of the moveable cup holder is inserted between a hole wall of the accommodation hole and the cup wall of the fixed cup holder; at least one ascending/descending spiral raised strip is provided on an outer surface of the cup wall of the fixed cup holder; at least one pair of guide blocks that clamps the ascending/descending spiral raised strip vertically and cooperates with the ascending/descending spiral raised strip to drive the moveable cup holder to ascend and descend is provided on an inner surface of the cup wall of the moveable cup holder; and when the moveable cup holder rotates around the fixed cup holder, one pair of guide blocks slides along a trajectory defined by the ascending/descending spiral raised strip and drives the moveable cup holder to ascend and descend, wherein one pair of guide blocks comprises an upper guide block and a lower guide block.

2. The cup holder with an adjustable depth according to claim 1, wherein the upper and lower guide blocks are staggered from each other in both a horizontal plane of projection and a vertical plane of projection, and the ascending/descending spiral raised strip passes between the upper and lower guide blocks.

3. The cup holder with an adjustable depth according to claim 2, wherein an upper end portion of the ascending/descending spiral raised strip terminates at an opening of the fixed cup holder, and a lower end portion of the ascending/descending spiral raised strip terminates at a cup bottom of the fixed cup holder.

4. The cup holder with an adjustable depth according to claim 2, wherein a first cup rim having a diameter greater than an outer diameter of the fixed cup holder is provided at a periphery of the opening of the fixed cup holder; the upper end portion of the ascending/descending spiral raised strip is a first straight raised strip segment parallel to the first cup rim, there is a smooth transition joint between the first straight raised strip segment and a spiral segment of the ascending/descending spiral raised strip, and a width dimension of the first straight raised strip segment is smaller than a width dimension of the spiral segment of the ascending/descending spiral raised strip and a vertical spacing between the upper and lower guide blocks in the vertical plane of projection; an upper stop block is provided between the first straight raised strip segment and the first cup rim, and a self-locking groove for insertion of the upper guide block is defined between the first cup rim and a segment of the first straight raised strip segment that is from the upper stop block to the transition joint between the first straight raised strip segment and the spiral segment of the ascending/descending spiral raised strip; and when the moveable cup holder ascends to the highest position, the upper guide block enters the self-locking groove so that the moveable cup holder is self-locked.

5. The cup holder with an adjustable depth according to claim 4, wherein a raised point is provided on the cup wall of the fixed cup holder at the transition joint between the first straight raised strip segment and the spiral segment of the ascending/descending spiral raised strip, so that when the moveable cup holder ascends to the highest position, the upper guide block moves over the raised point and enters the self-locking groove so that the moveable cup holder is self-locked.

6. The cup holder with an adjustable depth according to claim 4, wherein the lower end portion of the ascending/descending spiral raised strip is a second straight raised strip segment perpendicular to the cup bottom of the fixed cup holder, and a height dimension of the second straight raised strip segment is slightly greater than a width dimension of the lower guide block.

7. The cup holder with an adjustable depth according to claim 1, wherein a second cup rim is provided at an opening of the moveable cup holder, and friction strips are provided on an outer surface of the second cup rim.

8. The cup holder with an adjustable depth according to claim 1, wherein a second cup rim is provided at an opening of the moveable cup holder, and indentations for placement of fingers are provided on an outer surface of the second cup rim.

9. The cup holder with an adjustable depth according to claim 1, wherein an upward projecting protective flange is provided at a circumference of a top surface of the cup-holder base, and after the moveable cup holder descends to the lowest position, a top surface of the moveable cup holder is flush with or lower than a topmost surface of the protective flange.

10. The cup holder with an adjustable depth according to claim 1, wherein the accommodation hole on the cup-holder base and the fixed cup holder are integrated to form a unity, a hole wall of the accommodation hole directly serves as an inner surface of the cup wall of the fixed cup holder, the moveable cup holder is directly inserted into the accommodation hole, the moveable cup holder can rotate around the center of the accommodation hole and ascend and descend while rotating, and the inner cavity of the moveable cup holder and an inner cavity of the accommodation hole jointly define a container placement hole for placement of containers of different heights.

11. The cup holder with an adjustable depth according to claim 10, wherein at least one ascending/descending spiral raised strip is provided on an inner surface of the hole wall of the accommodation hole; at least one pair of guide blocks that clamps the ascending/descending spiral raised strip vertically and cooperates with the ascending/descending spiral raised strip to drive the moveable cup holder to ascend and descend is provided on an inner surface of the cup wall of the moveable cup holder; and when the moveable cup holder rotates around the center of the accommodation hole, one pair of guide blocks slides along a trajectory defined by the ascending/descending spiral raised strip and drives the moveable cup holder to ascend and descend, wherein one pair of guide blocks comprises an upper guide block and a lower guide block.

12. A cup holder with an adjustable depth, comprising:
a cup-holder base, having at least one accommodation hole;
a fixed cup holder, fixed in the accommodation hole of the cup-holder base; and
a moveable cup holder, moveably sleeved over the fixed cup holder and capable of rotating around the fixed cup holder to ascend and descend, wherein during ascending and descending of the moveable cup holder, an inner cavity of the moveable cup holder and an inner cavity of the fixed cup holder jointly define a container placement hole for placement of containers of different heights, wherein at least one hook is provided at a cup bottom of the fixed cup holder, a notch at a position corresponding to each hook is provided at the bottom of the accommodation hole on the cup-holder base, and the hook is engaged in the notch so that the fixed cup holder is fixed in the accommodation hole on the cup-holder base.

13. A cup holder with an adjustable depth, comprising:
a cup-holder base, having at least one accommodation hole;
a fixed cup holder, fixed in the accommodation hole of the cup-holder base; and
a moveable cup holder, moveably sleeved over the fixed cup holder and capable of rotating around the fixed cup holder to ascend and descend, wherein during ascending and descending of the moveable cup holder, an inner cavity of the moveable cup holder and an inner cavity of the fixed cup holder jointly define a container placement hole for placement of containers of different heights, wherein the fixed cup holder and the moveable cup holder both have a cup wall; at least one ascending/descending spiral raised strip is provided on an inner surface of the cup wall of the moveable cup holder; at least one pair of guide blocks that clamps the ascending/descending spiral raised strip vertically and cooperates with the ascending/descending spiral raised strip to drive the moveable cup holder to ascend and descend is provided on an outer surface of the cup wall of the fixed cup holder; and when the moveable cup holder rotates around the fixed cup holder, one pair of guide blocks slides along a trajectory defined by the ascending/descending spiral raised strip and drives the moveable cup holder to ascend and descend, wherein one pair of guide blocks comprises an upper guide block and a lower guide block.

* * * * *